(12) United States Patent
Gordon

(10) Patent No.: US 11,470,059 B2
(45) Date of Patent: Oct. 11, 2022

(54) SYSTEMS AND METHODS FOR ESTABLISHING SECURE COMMUNICATION IN AN ELECTRIC POWER DISTRIBUTION SYSTEM

(71) Applicant: Schweitzer Engineering Laboratories, Inc., Pullman, WA (US)

(72) Inventor: Colin Gordon, Katy, TX (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 173 days.

(21) Appl. No.: 17/070,339

(22) Filed: Oct. 14, 2020

(65) Prior Publication Data
US 2022/0116367 A1    Apr. 14, 2022

(51) Int. Cl.
*H04L 9/40*    (2022.01)
*H02J 13/00*   (2006.01)

(52) U.S. Cl.
CPC .... *H04L 63/0435* (2013.01); *H02J 13/00034* (2020.01); *H04L 63/068* (2013.01); *H04L 63/162* (2013.01)

(58) Field of Classification Search
CPC . H04L 63/0435; H04L 63/068; H04L 63/162; H02J 13/00034
USPC ......................................................... 713/168
See application file for complete search history.

(56) References Cited

U.S. PATENT DOCUMENTS

| | | | |
|---|---|---|---|
| 5,809,140 A * | 9/1998 | Rubin | H04L 9/0827 713/172 |
| 7,729,276 B2 | 6/2010 | Akyol | |
| 11,163,018 B1 * | 11/2021 | Wei | G01R 31/54 |
| 2012/0266209 A1 * | 10/2012 | Gooding | H04L 63/20 726/1 |
| 2015/0382187 A1 * | 12/2015 | Kruglick | H04W 12/0471 380/44 |

(Continued)

FOREIGN PATENT DOCUMENTS

| | | | | |
|---|---|---|---|---|
| AU | 2012379054 A1 * | 10/2014 | | H04L 61/1511 |
| CA | 2550561 A1 * | 1/2007 | | H04L 65/4061 |

(Continued)

OTHER PUBLICATIONS

Indukuri, "Layer 2 security for Smart Grid networks," 2012 IEEE International Conference on Advanced Networks and Telecommunciations Systems (ANTS), 2012, pp. 99-104, doi: 10.1109/ANTS.2012.6524237. (Year: 2012).*

(Continued)

*Primary Examiner* — Peter C Shaw
(74) *Attorney, Agent, or Firm* — Fletcher Yoder, P.C.

(57) ABSTRACT

A system includes an intelligent electronic device (IED) of an electric power distribution system and a key device. The key device is configured to perform operations that include receiving a request from the TED for communication with an additional component of the electrical power distribution system, establishing a Media Access Control security key agreement (MKA) connectivity association with the TED in response to receipt of the request, generating a security association key (SAK) in response to receipt of the request, and distributing the SAK to the IED via the MKA connectivity association to enable the TED to use the SAK to communicate via a Media Access Control security (MACsec) communication link that is isolated from the key device.

17 Claims, 5 Drawing Sheets

(56) References Cited

U.S. PATENT DOCUMENTS

| | | | |
|---|---|---|---|
| 2017/0012949 A1* | 1/2017 | Boren | H04L 63/045 |
| 2019/0116183 A1 | 4/2019 | Hussain | |
| 2019/0173860 A1 | 6/2019 | Sankaran | |
| 2019/0342101 A1 | 11/2019 | Hayes | |
| 2020/0106719 A1 | 4/2020 | Acharya | |
| 2020/0112434 A1* | 4/2020 | Goodson | H02J 13/00028 |
| 2022/0029464 A1* | 1/2022 | Smith | G06F 21/44 |

FOREIGN PATENT DOCUMENTS

| | | | | |
|---|---|---|---|---|
| CA | 2758681 C | * | 9/2018 | G01D 4/002 |
| CA | 2882856 C | * | 2/2021 | H04L 67/16 |
| CN | 200977153 Y | * | 11/2007 | |
| CN | 103490891 A | * | 1/2014 | |
| FR | 2973901 A1 | * | 10/2012 | H04L 63/0492 |
| FR | 3076679 A1 | * | 7/2019 | B64D 45/00 |
| WO | WO-2004006608 A1 | * | 1/2004 | G08B 25/10 |

OTHER PUBLICATIONS

Moussa et al., "Security Assessment of Time Synchronization Mechanisms for the Smart Grid," in IEEE Communications Surveys & Tutorials, vol. 18, No. 3, pp. 1952-1973, thirdquarter 2016, doi: 10.1109/COMST.2016.2525014. (Year: 2016).*

Kamto et al., "Key Distribution and management for power aggregation and accountability in Advance Metering Infrastructure," 2012 IEEE Third International Conference on Smart Grid Communications (SmartGridComm), 2012, pp. 360-365, doi: 10.1109/SmartGridComm.2012.6486010. (Year: 2012).*

Yan et al., "A secure and reliable in-network collaborative communication scheme for advanced metering infrastructure in smart grid ," 2011 IEEE Wireless Communications and Networking Conference, 2011, pp. 909-914, doi: 10.1109/WCNC.2011.5779257. (Year: 2011).*

Suhendra et al., "Lightweight Key Management Protocols for Smart Grids," IEEE , 2016, pp. 345-348, doi: 10.1109/iThings-GreenCom-CPSCom-SmartData.2016.82. (Year: 2016).*

* cited by examiner

SYSTEMS AND METHODS FOR ESTABLISHING SECURE COMMUNICATION IN AN ELECTRIC POWER DISTRIBUTION SYSTEM

BACKGROUND

This disclosure relates to systems and methods for generating and distributing keys for establishing a secure communication link between different components of an electric power distribution system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be noted that these statements are to be read in this light, and not as admissions of any kind.

Electric power distribution systems carry electricity from a transmission system to residential communities, factories, industrial areas, and other electricity consumers. An electric power distribution system may include various intelligent electronic devices (IEDs) that may communicate with other components of the electric power distribution system. For example, an IED may receive and/or transmit a signal and/or data in order to perform a function (e.g., controlling a circuit breaker in response to electrical measurements of the electric power distribution system). Unfortunately, it may be difficult to establish a secure communication link between the IED and other components of the electric power distribution system to enable the components to securely communicate with one another.

SUMMARY

Certain examples commensurate in scope with the originally claimed subject matter are discussed below. These examples are not intended to limit the scope of the disclosure. Indeed, the present disclosure may encompass a variety of forms that may be similar to or different from the examples set forth below.

In an embodiment, a system includes an intelligent electronic device (IED) of an electric power distribution system and a key device. The key device is configured to perform operations that include receiving a request from the IED for communication with an additional component of the electrical power distribution system, establishing a Media Access Control security key agreement (MKA) connectivity association with the IED in response to receipt of the request, generating a security association key (SAK) in response to receipt of the request, and distributing the SAK to the IED via the MKA connectivity association to enable the IED to use the SAK to communicate via a Media Access Control security (MACsec) communication link that is isolated from the key device.

In an embodiment, a controller of a key device for an electric power distribution system includes a tangible, non-transitory computer readable medium having instructions that, when executed by processing circuitry, are configured to cause the processing circuitry to receive a request from a first intelligent electronic device (IED) of the electric power distribution system, generate symmetrical security association keys (SAKs) in response to receipt of the request, distribute a first copy of the symmetrical SAKs to the first IED via a first communication link upon generating the symmetrical SAKs, and distribute a second copy of the symmetrical SAKs to a second IED of the electric power distribution system via a second communication link upon generating the symmetrical SAKs, thereby enabling the first IED and the second IED to use the first copy and the second copy of the symmetrical SAKs, respectively, to communicate with one another via a Media Access Control security (MACsec) communication link that is separate from the first communication link, the second communication link, and the key device.

In an embodiment, a system includes a first intelligent electronic device (IED), a second IED, and a key device configured to perform operations that include receiving a request from the first IED to establish a secure communication link with the second IED, the secure communication link being isolated from the key device, establishing a first Media Access Control security key agreement (MKA) connectivity association with the first IED in response to receipt of the request, and establishing a second MKA connectivity association with the second IED in response to receipt of the request. The key device is also configured to perform operations that include generating a first copy of a security association key (SAK) and a second copy of the SAK in response to receipt of the request, distributing the first copy of the SAK to the first IED via the first MKA connectivity association, and distributing the second copy of the SAK to the second IED via the second MKA connectivity association.

DETAILED DESCRIPTION

Figure 1:
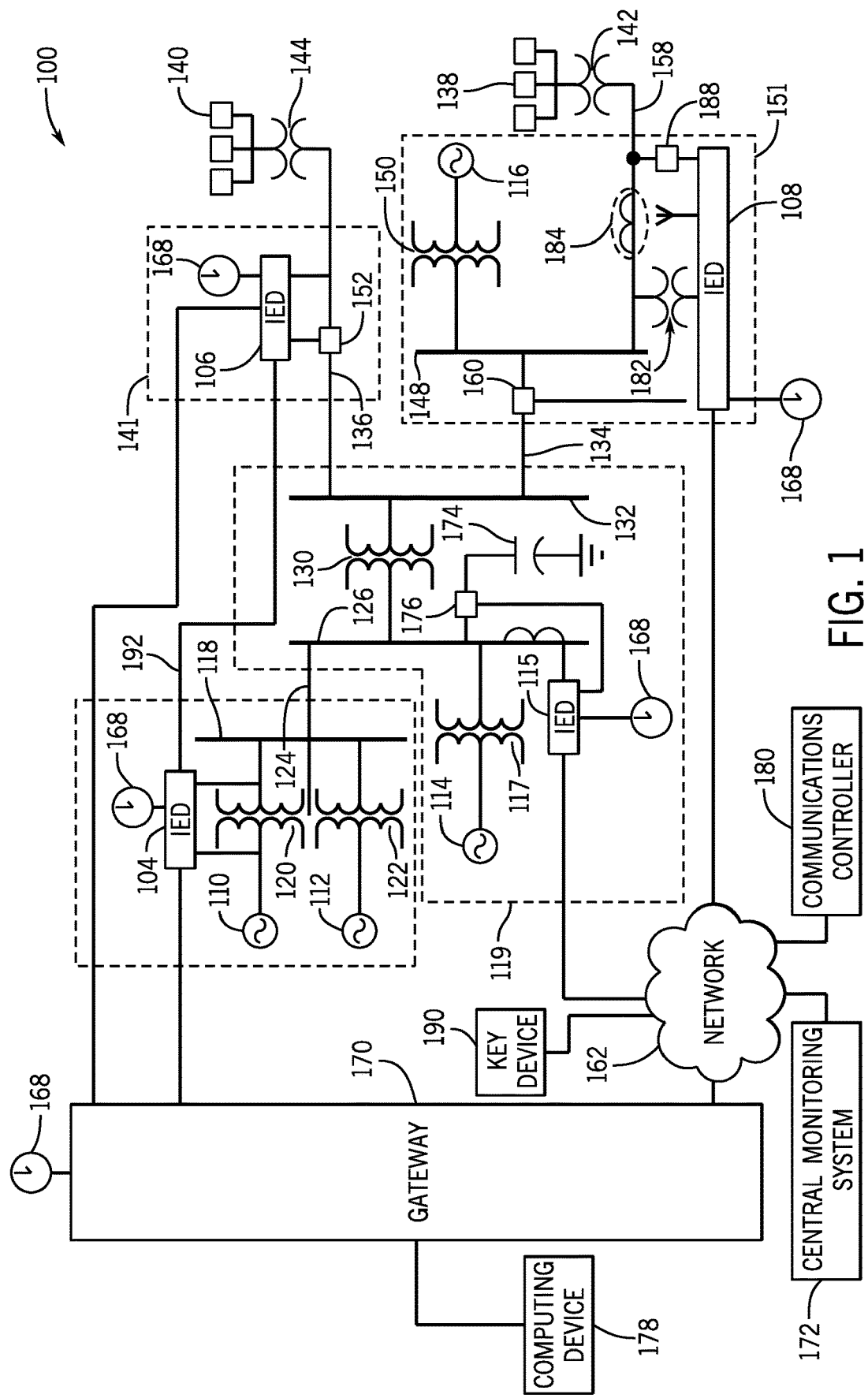
FIG. 1 is a schematic diagram of an embodiment of an electric power distribution system, in accordance with an embodiment of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the procedures of a method do not necessarily need to be executed in any specific order, or even sequentially, nor need the procedures be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

Furthermore, some depictions of logic circuitry have been described via this disclosure. It should be noted that logically equivalent circuitry may be used herein to implement the systems and methods described. For example, a logical XOR gate may be replaced via a logically equivalent combination of NOT gates, AND gates, Inverse NOT gates, OR gates, NAND gates, NOR gates, or the like.

Embodiments of the present disclosure are directed to establishing a communication link between components of an electric power distribution system. Intelligent electronic devices (IEDs) may be used to control certain devices and to perform certain operations of the electric power distribution system. For example, an IED may be a relay that enables or blocks electrical power to flow between other components of the electric power distribution system. The IED may, for instance, communicate with a computing device, and the IED may operate based on the communication with the computing device (e.g., based on a user input). Furthermore, multiple IEDs may transmit data, such as operating information or sensor data, to one another to control various functions of components of the electric power distribution system. As such, the IEDs may facilitate operation of the electric power distribution system.

This disclosure provides for the secure and efficient establishment of a secure communication link with use of keys (e.g., cryptographic keys). For example, embodiments of the present disclosure include a key device that may generate keys for use in implementing Media Access Control security (MACsec) to transfer data securely between the components of the electric power distribution system, such as components that are coupled directly to one another via a point-to-point communication link (e.g., a physical cable). To this end, a MACsec key agreement (MKA) protocol is initially established between the key device and one of the components. The MKA protocol may include providing a connectivity association key (CAK) to the component. Upon verification that the component possesses the CAK, the key device may distribute a security association key (SAK) to the component. The component may then use the SAK to securely communicate with another component of the electric power distribution system. For instance, the key device may distribute copies of the same SAK to multiple components to enable such components to encrypt and decrypt data transmitted between the components. Thus, the components may securely transmit data using the copies of the SAK provided by the key device.

The key device may reduce a complexity or otherwise facilitate the components to communicate with one another via a secure communication link. For example, the key device may generate and provide the SAKs for use without the components having to generate and provide their own SAKs. In this manner, the components do not have to be manufactured, modified, updated, or maintained to enable the components to generate and distribute SAKs. Rather, a single key device may be updated to enable the components to communicate with one another via the SAKs. Indeed, the key device may be easily replaced or modified without having to perform additional actions on the components to enable the use of SAKs for secure communication within the electric power distribution system. Additionally, the keys distributed by the key device may enable the components to communicate with one another via a secure communication link that is separate or isolated from the control of and/or the view of the key device. That is, the components may communicate with one another without having the key device be communicatively coupled to (e.g., in the same network as) the secure communication link established between the components. In this manner, the establishment of the secure communication link may be simplified, and the direct communication links may improve performance associated with communicating data. For example, the direct communication links may be unaffected by communications made by other components to minimize latency and to enable protection protocols to perform with increased availability.

With the preceding in mind, FIG. 1 is a schematic diagram of an electric power distribution system 100 that may generate, transmit, and/or distribute electric energy to various loads (e.g., different structures). The electric power distribution system 100 may use various IEDs 104, 106, 108, 115 to control certain aspects of the electric power distribution system 100. As used herein, an IED (e.g., the IEDs 104, 106, 108, 115) may refer to any processing-based device that monitors, controls, automates, and/or protects monitored equipment within the electric power distribution system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power distribution system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the power distribution system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power distribution system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power distribution system 100 using a communications network 162 and/or using a common time source, such as a Global Navigation Satellite System ("GNSS"), or the like.

The IEDs 104, 106, 108, 115 may be used for controlling various other equipment of the electrical power distribution system 100. By way of example, the illustrated electric power distribution system 100 includes electric generators 110, 112, 114, 116 and power transformers 117, 120, 122, 130, 142, 144, 150. The electric power distribution system 100 may also include electric power lines 124, 134, 136, 158 and/or busses 118, 126, 132, 148 to transmit and/or deliver power, circuit breakers 152, 160, 176 to control flow of power in the electric power distribution system 100, and/or loads 138, 140 to receive the power in and/or from the electric power distribution system 100. A variety of other types of equipment may also be included in electric power distribution system 100, such as a voltage regulator, a capacitor (e.g., a capacitor 174), a potential transformer (e.g., a potential transformer 182), a current sensor (e.g., a wireless current sensor (WCS) 184), an antenna, a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the distribution bus 132 via the power transformer 130 (e.g., a step-down transformer). Various electric power lines 136, 134 may be connected to the distribution bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the distribution bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A gateway 170, such as a network gateway, may be in communication with the IEDs 104, 106, 108, 115. The IEDs 104, 106, 108 115 may be remote from the gateway 170 and may communicate over various media. For instance, the gateway 170 may be directly in communication with the IEDs 104, 106 and may be in communication with the IEDs 108, 115 via the communications network 162. The gateway 170 may enable or block data flow between any of the IEDs 104, 106, 108, 115 and another component communicatively coupled to the gateway 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power distribution system 100 via the gateway 170 and/or to send data, such as a user input, to the electric power distribution system 100 via the gateway 170. Thus, the gateway 170 may enable or block operation of the electric power distribution system 100 via the computing device 178. In some embodiments, some of the IEDs 104, 106, 108, 115 may also be in communication with one another. As a result, the IEDs 104, 106, 108, 115 may transmit data with one another to perform various functionalities. For instance, the computing device 178 may transmit data to one of the IEDs 104, 106, 108, 115, which may cause data to be transmitted to another one of the IEDs 104, 106, 108, 115.

A communications controller 180 may interface with equipment in the communications network 162 to create a software-defined network (SDN) that facilitates communication between the gateway 170, the IEDs 108, 115, and/or the central monitoring system 172. In various embodiments, the communications controller 180 may interface with a control plane (not shown) in the communications network 162. Using the control plane, the communications controller 180 may direct the flow of data within the communications network 162.

In some embodiments, the gateway 170 and the IEDs 104, 106, 108, 115 may communicate with one another via a MACsec communication link. The MACsec communication link may be initiated via SAKs distributed to enable encryption and/or decryption of data. To this end, the electric power distribution system 100 may include a key device or server 190 configured to generate and distribute keys, such as CAKs and/or SAKs, via the network 162. By way of example, the key device 190 may establish an MKA connectivity association with a first component (e.g., one of the gateway 170 and/or any of the IEDs 104, 106, 108, 115) and a separate MKA connectivity association with a second component (e.g., another one of the gateway 170 and/or any of the IEDs 104, 106, 108, 115) via an MKA protocol. The MKA protocol includes establishing an adoption link between the key device 190 and the other component of the electric power distribution system 100, distributing a CAK via the adoption link, and establishing an MKA connectivity association based on a verified possession of the CAK.

The key device 190 may distribute symmetrical or identical copies of the same SAK via the respective MKA connectivity associations that have been established via the MKA protocol such that the first component and the second component have copies of the same SAK. The first component and the second component may then communicate with one another via the SAKs. Indeed, the SAK may be used to encrypt data to be transferred as well as to decrypt encrypted data that has been received. Such encrypted data is transferred via a point-to-point MACsec communication link 192 established between the components to transfer the data securely. The MACsec communication link 192 is isolated or separate from the key device 190 such that the key device 190 does not have access to or is not communicatively coupled to the MACsec communication link 192. Indeed, the MACsec communication link 192 may be established outside of the network 162. In this manner, the key device 190 may facilitate components of the electric power distribution system 100 to directly communicate with one another via the MACsec communication link without having to directly establish the MACsec communication link 192. Although the present disclosure primarily discusses the use of MACsec communication links, any other suitable communication techniques may be used to enable data transfer between components of the electric power distribution system 100.

Figure 2:
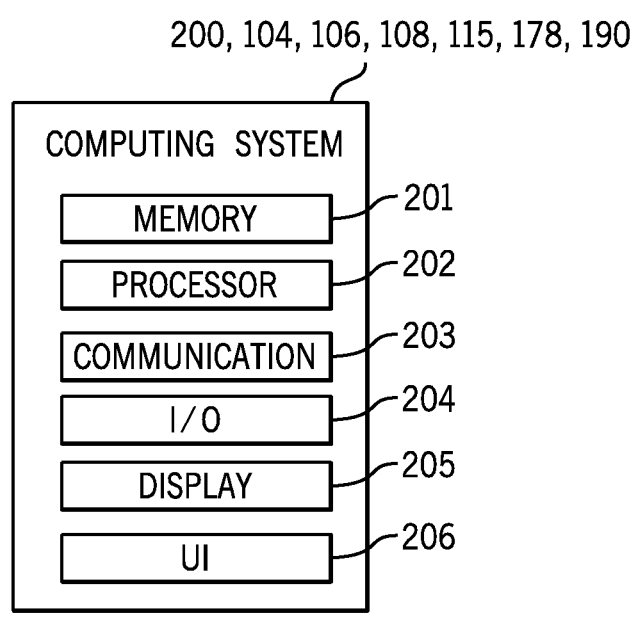
FIG. 2 is a schematic diagram of an embodiment of a computing system that may be incorporated in a component of an electric power distribution system, in accordance with an embodiment of the present disclosure.

FIG. 2 is a schematic diagram of an embodiment of a computing system 200 that may be incorporated within a component of the electric power distribution system 100, such as in any of the IEDs 104, 106, 108, 115, the gateway 170, the computing device 178, and/or the key device 190. The computing system 200 may include a memory 201 and a processor or processing circuitry 202. The memory 201 may include a non-transitory computer-readable medium that may store instructions that, when executed by the processor 202, may cause the processor 202 to perform various methods described herein. To this end, the processor 202 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 202 may, in some embodiments, include multiple processors.

The computing system 200 may also include a communication system 203, which may include a wireless and/or wired communication component to establish a communication link with another component of the electric power distribution system 100. That is, the communication system 203 enables the computing system 200 (e.g., of one of the IEDs 104, 106, 108, 115) to communication with another communication system 203 of another computing system 200 (e.g., of the gateway 170), such as via MACsec. Indeed, the communication system 203 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 203 may also include a network interface to enable communication via various protocols such as EtherNet/IP®, ControlNet®, DeviceNet®, or any other industrial communication network protocol.

Additionally, the computing system 200 may include input/output (I/O) ports 204 that may be used for communicatively coupling the computing system 200 to an external device. For example, the I/O ports 204 of the computing system 200 of the gateway 170 may communicatively couple to corresponding I/O ports 204 of the computing system 200 of the computing device 178. The computing system 200 may further include a display 205 that may present any suitable image data or visualization. Indeed, the display 205 may present image data that includes various information regarding the electric power distribution system 100, thereby enabling the user to observe an operation, a status, a parameter, other suitable information, or any combination thereof, of the electric power distribution system 100. Further still, the computing system 200 may include a user interface (UI) 206 with which the user may interact to control an operation of the computing system 200. For instance, the UI 206 may include a touch screen (e.g., as a part of the display 205), an eye-tracking sensor, a gesture (e.g., hand) tracking sensor, a joystick or physical controller, a button, a knob, a switch, a dial, a trackpad, a mouse, another component, or any combination thereof. As an example, the user may utilize the UI 206 of the computing system 200 of the computing device 178 to transmit data to the gateway 170.

Figure 3:
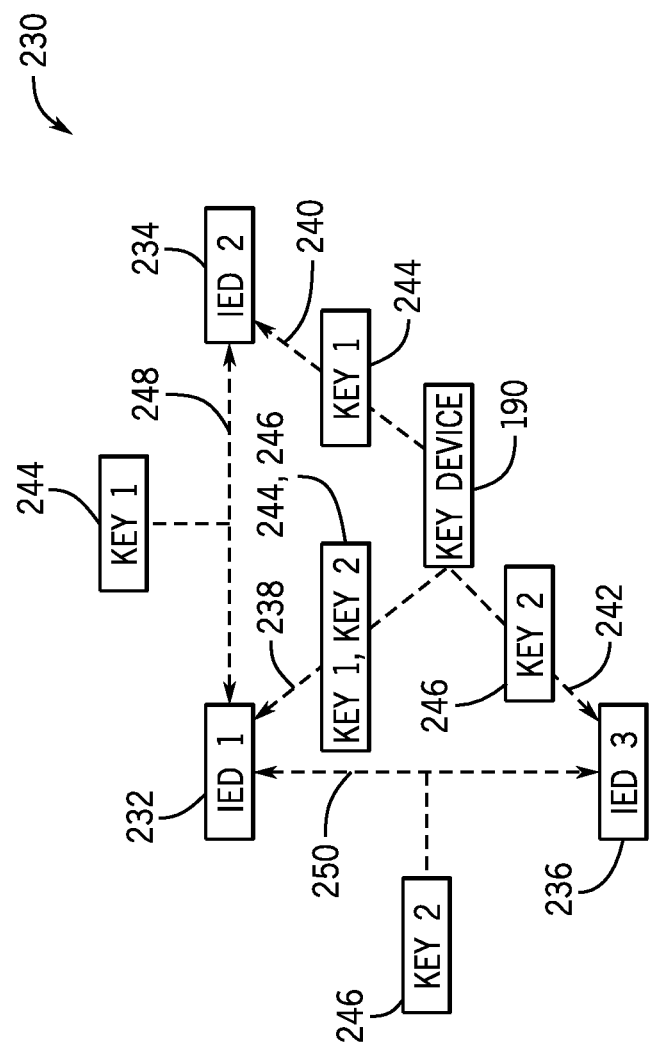
FIG. 3 is a schematic diagram of an embodiment of a communication system having a key device configured to distribute keys to components of an electric power distribution system, in accordance with an embodiment of the present disclosure.

As discussed above, the key device 190 may be used to enable various components of the electric power distribution system 100 to directly communicate with one another, such as via a point-to-point communication link. FIG. 3 is a schematic diagram of an embodiment of a communication system 230 that includes the key device 190, a first IED 232, a second IED 234, and a third IED 236. In some embodiments, the key device 190 may be at the same location (e.g., the same electrical substation) as one of the IEDs 232, 234, 236. Alternatively, the key device 190 may be at a remote location that does not include any of the IEDs 232, 234, 236. In the illustrated embodiment, the first IED 232 and the second IED 234 are in direct communication with one another (e.g., via a first point-to-point communication link to which the key device 190 does not have access), and the first IED 232 and the third IED 236 are in direct communication with one another (e.g., via a separate, second point-to-point communication link to which the key device 190 does not have access). In this manner, the first IED 232 and the second IED 234 may communicate with one another without having to rely on performance of the key device 190. For example, communication between the key device 190 and another component may not affect (e.g., impede) the communication between the first IED 232 and the second IED 234, thereby improving latency and reliability of the secure communication link between the first IED 232 and the second IED 234. In additional or alternative embodiments, the IEDs 232, 234, 236 may be in direct communication with other components, such as with the gateway 170, the computing device 178, another IED, and so forth.

The key device 190 may be communicatively coupled to the first IED 232, the second IED 234, and the third IED 236 via a first MKA connectivity association 238, a second MKA connectivity association 240, and a third MKA connectivity association 242, respectively. By way of example, each of the MKA connectivity associations 238, 240, 242 may be established via a request sent by a corresponding one of the IEDs 232, 234, 236. The key device 190 may distribute various keys via the MKA connectivity associations 238, 240, 242 to enable the IEDs 232, 234, 236 to communicate with one another via secure communication links that are outside of the control or the view of the key device 190.

As an example, the key device 190 may distribute a first key (e.g., a first SAK) 244 in response to a first request, and the key device 190 may distribute a second key (e.g., a second SAK) 246 in response to a second request. For instance, the first IED 232 may transmit the first request to the key device 190 to securely communicate with the second IED 234 and/or the second IED 234 may transmit the first request to the key device 190 to securely communicate with the first IED 232. As such, the key device 190 may generate the first key 244 and distribute a copy of the first key 244 to the first IED 232 via the first MKA connectivity association 238 and another copy of the first key 244 to the second IED 234 via the second MKA connectivity association 240. Therefore, the first IED 232 and the second IED 234 may use their respective copies of the first keys 244 to encrypt and decrypt data transmitted with one another, thereby securely communicating with one another. Indeed, the first key 244 may enable the first IED 232 and the second IED 234 to directly communicate with one another via a first MACsec communication link 248 without having to use an additional component that encrypts information, decrypts information, or otherwise securely transmits information between the first IED 232 and the second IED 234. Further, the first MACsec communication link 248 may be isolated from the view of and/or the control of the key device 190 such that the IEDs 232, 234 may communicate with one another without having the key device 190 be directly attached to the first MACsec communication link 248.

Further, the first IED 232 may transmit the second request to the key device 190 to securely communicate with the third IED 236 and/or the third IED 236 may transmit the second request to the key device 190 to securely communicate with the first IED 232. In response, the key device 190 may generate the second key 246 and distribute a copy of the second key 246 to the first IED 232 via the first MKA connectivity association 238 and another copy of the second key 246 to the third IED 236 via the third MKA connectivity association 242. For this reason, the first IED 232 and the third IED 236 may use their respective copies of the second keys 246 to securely and directly communicate with one another, such as via a second MACsec communication link 250. The second MACsec communication link 250 may be isolated from the view of and/or the control of the key server 190 such that the IEDs 232, 236 may communicate with one another without having the key device 190 be directly attached to the second MACsec communication link 250.

In certain embodiments, the key device 190 may be modified, replaced, or otherwise updated without limiting the communication between the IEDs 232, 234, 236 via the keys 244, 246. For example, the IEDs 232, 234, 236 may continue to communicate with one another via the keys 244, 246 while the key device 190 is unavailable. Further, an updated key device 190 may continue to distribute keys to the IEDs 232, 234, 236 without having to modify any of the IEDs 232, 234, 236. Indeed, a single component (i.e., the key device 190) may be updated to enable the IEDs 232, 234, 236 to communicate with one another via the MACsec communication links 248, 250, thereby limiting the number of components to be updated to implement MACsec. Moreover, after one of the IEDs 232, 234, 236 has been modified, replaced, or otherwise updated, the key device 190 may continue to provide a key to the updated IED and without having to modify another one of the IEDs 232, 234, 236 or the key device 190. As such, the key device 190 may simplify or facilitate the IEDs 232, 234, 236 to maintain communication with one another in response to a modification of the communication system 230.

Although the key device 190 is configured to distribute keys 244, 246 to IEDs 232, 234, 236 in the illustrated communication system 230, in an additional or alternative embodiment, the communication system 230 may distribute different keys to another component of the electric power distribution system 100, such as to the gateway 170, to enable the other component to communicate via a MACsec communication link. In further embodiments, the key device 190 may be configured to distribute copies of the same key to each of the IEDs 232, 234, 236. That is, the key device 190 may distribute the copy of the same key to each of the IEDs 232, 234, 236 to enable any of the IEDs 232, 234, 236 to communicate with one another via a respective MACsec communication link. Further still, it should be noted that the key device 190 may be configured to generate and distribute multiple copies of different keys to each of the IEDs 232, 234, 236. As an example, the key device 190 may be configured to generate and distribute an updated key at a particular frequency, such as after a threshold block of time has elapsed (e.g., after a week, after a month) and/or after a threshold amount of data (e.g., 2 billion frames) has been transferred using a particular key, thereby establishing updated MACsec communication links. While the key device 190 is shown to be a separate device, in some examples, the key device 190 may be a hardware or software module of an IED 232, 234, 236. The key device 190 may, additionally or alternatively, represent a computer program product stored in memory (e.g., software on a computing system 200) that can be executed to generate and distribute the keys.

Each of FIGS. 4 and 5 below illustrates a method to establish a MACsec communication link between components of the electric power distribution system 100. In some embodiments, each of the methods may be performed by a single respective component, such as by the computing system 200 (e.g., the processor 202). In additional or alternative embodiments, multiple components may perform the procedures for a single one of the methods. It should also be noted that additional procedures may be performed with respect to the described methods. Moreover, certain procedures of the depicted methods may be removed, modified, and/or performed in a different order. Further still, the procedures of any of the respective methods may be performed in parallel with one another, such at the same time and/or in response to one another.

Figure 4:
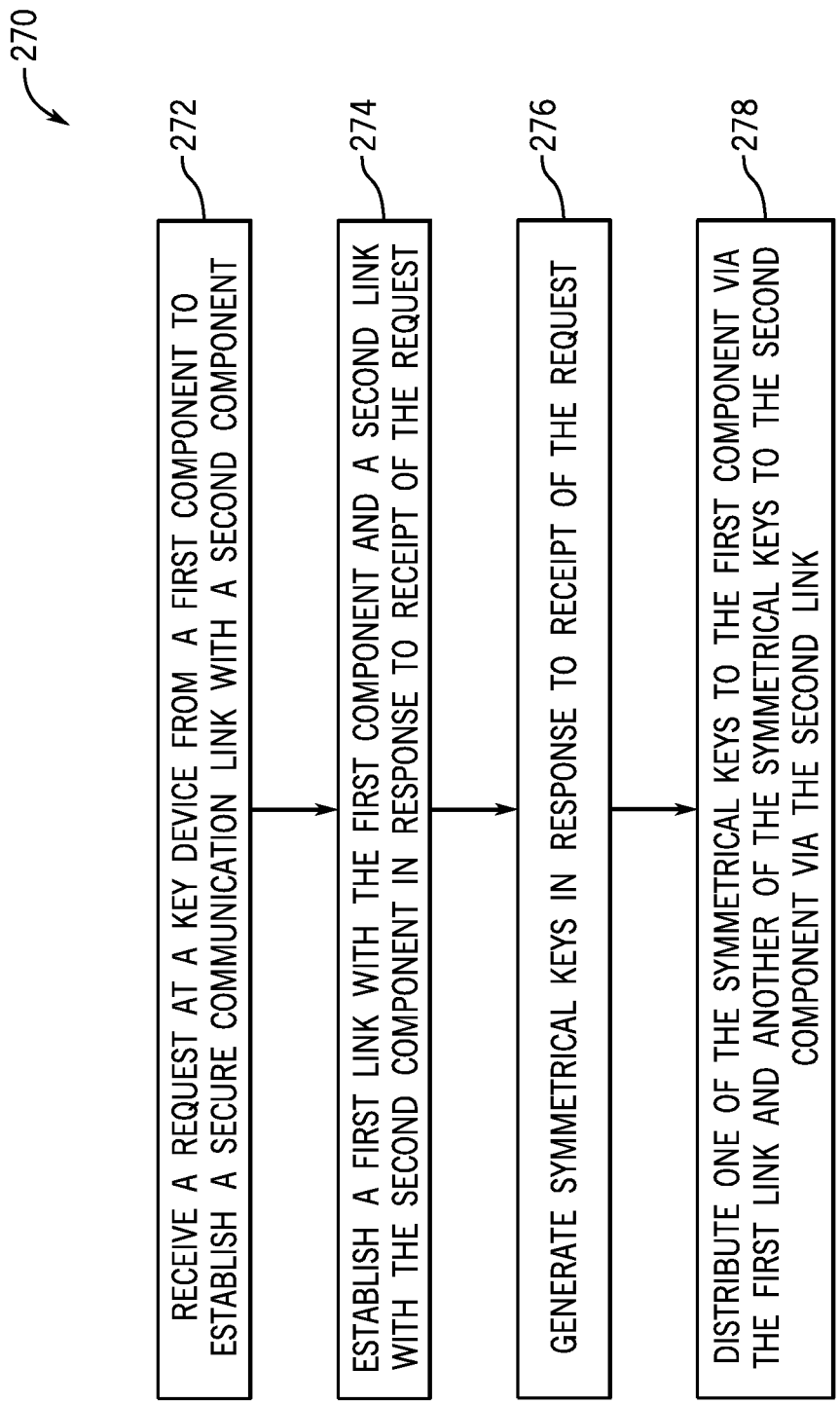
FIG. 4 is a flowchart of an embodiment of a method for establishing a Media Access Control security (MACsec) communication link between components of an electric power distribution system, in accordance with an embodiment of the present disclosure.

FIG. 4 is a flowchart of an embodiment of a method 270 for establishing a MACsec communication link between components of the electric power distribution system 100, such as between two of the IEDs 104, 106, 108, 115. The method 270 is described from the perspective of the key device 190 to perform the described procedures, and the method 270 may be performed prior to there being an existing secure communication link and/or in order to update an existing secure communication link between the components of the electric power distribution system 100. At block 272, the key device 190 may receive a request from a first component of the electric power distribution system 100 to establish a secure communication link with a second component of the electric power distribution system 100. At block 274, the key device 190 may establish a first link with the first component and a second link with the second component in response to receipt of the request. For instance, the key device 190 may identify the second component to which the first component is to be securely coupled based on the request, and the key device 190 may therefore communicate with both the first component and the second component to establish the respective first and second links.

By way of example, the first link may be a first MKA connectivity association and the second link may be a second MKA connectivity association established via MKA protocol. In some embodiments, there may be a link established between the key device 190 and the first component through which keys may be exchanged. For instance, prior to there being any secure communication link between the key device 190 and the first component, the key device 190 the first component may generate a CAK (e.g., based on a user input) that may be identified by the key device 190 when the first component transmits the request to the key device 190. Based on the identification of the CAK, the key device 190 may establish an adoption link with the first component and may generate a new CAK to provide to the first component via the adoption link. The key device 190 may then continuously verify that the first component possesses the new CAK and, so long as the first component possesses the new CAK, the key device 190 may establish and maintain the first MKA connectivity association with the first component. The key device 190 may similarly establish an adoption link with the second component upon identification of the CAK of the first component and upon receipt of the request by the first component. The key device 190 may provide another CAK to the second component via the adoption link and may establish and maintain the second MKA connectivity association with the second component based on the second component possessing the CAK.

At block 276, in response to the request received with respect to block 272, the key device 190 may also generate symmetrical SAKs, or copies of the same SAK. At block 278, after the first MKA connectivity association has been established between the key device 190 and the first component, after the second MKA connectivity association has been established between the key device 190 and the second component, and after the symmetrical SAKs have been generated, the key device 190 may distribute one of the symmetrical SAKs to the first component via the first MKA connectivity association and another one of the symmetrical SAKs to the second component via the second MKA connectivity association. As a result, the first component and the second component may use their respective symmetrical SAKs to encrypt and decrypt data transmitted between the first component and the second component, thereby establishing a MACsec communication link to securely communicate with one another. The MACsec communication link is isolated from the key device 190.

Figure 5:
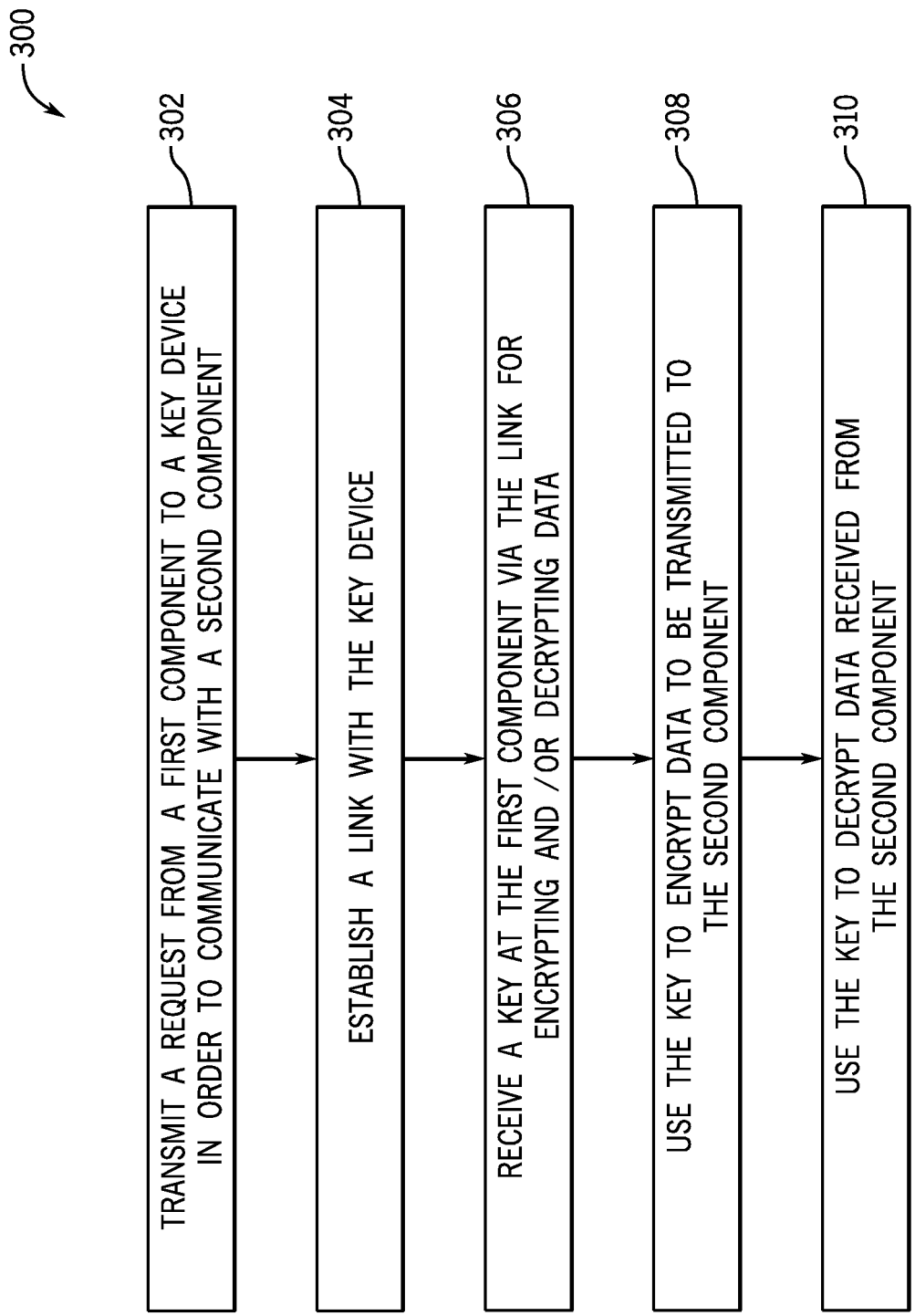
FIG. 5 is a flowchart of an embodiment of a method for establishing a MACsec communication link between components of an electric power distribution system, in accordance with an embodiment of the present disclosure.

FIG. 5 is a flowchart of an embodiment of a method 300 for establishing a MACsec communication link between components of the electric power distribution system 100, such as between two of the IEDs 104, 106, 108, 115. The method 300 is described from the perspective of one of the components, and the method 300 may be performed prior to there being an existing secure communication link and/or to update an existing secure communication link between the components of the electric power distribution system 100. At block 302, a first component may transmit a request to the key device 190 to indicate that the first component is to communicate with a second component. At block 304, the first component may establish a link with the key device 190 as a result of transmitting the request. For instance, the link may be an MKA connectivity association that is established and maintained based on verification that the first component possesses a CAK (e.g., a CAK received from the key device 190 via an adoption link established in response to transmitting the request to the key device 190). In additional or alternative embodiments, there may already be a link established between the key device 190 and the first component prior to the first component transmitting the request as described with respect to block 302.

At block 306, the first component may receive an SAK (e.g., a copy of a symmetrical SAK) from the key device 190 via the link established with respect to block 304. The first component may use the SAK in order to securely communicate with the second component. For example, at block 308, the first component may use the SAK to encrypt data to be transmitted to the second component. For instance, the second component may possess a copy of the same SAK and may use the copy of the SAK to decrypt the encrypted data received from the second component. Additionally or alternatively, at block 310, the first component may receive data that was encrypted by the second component via the copy of the SAK. As such, the first component may use the SAK to decrypt the encrypted data. In this manner, the first component and the second component may be able to securely communicate with one another via copies of the SAK using a MACsec communication link. Indeed, the first component and the second component may be able to directly and securely communicate with one another using the SAKs received from the key device 190.

Although each of FIGS. 4 and 5 describes the key device 190 as distributing a single SAK to each of the first component and the second component, it should be noted that the key device 190 may distribute any suitable number of keys to enable the first component and the second component to communicate with one another. As an example, the key device 190 may distribute multiple SAKs at once in response to a request. As another example, the key device 190 may distribute SAKs at a particular frequency (e.g., based on the first component sending a request at the particular frequency), so long as the first MKA connectivity association and the second MKA connectivity association are maintained with the first component and the second component, respectively. As a further example, the key device 190 may periodically update or re-establish the first MKA connectivity association and/or the second MKA connectivity association by providing updated CAKs (e.g., via the adoption link). That is, for example, the key device 190 may provide an updated CAK to the first component with which the first component uses to replace a currently possessed CAK, and the key device 190 may then establish an updated MKA connectivity association with the first component based on a verification that the first component possesses the updated CAK. As such, the key device 190 may confirm that the first component is to be communicatively coupled to the key device 190 in order to transmit SAKs to the first component (e.g., for use in communicating with the second component).

While specific embodiments and applications of the disclosure have been illustrated and described, it is to be noted that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be noted that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A system, comprising:
   an intelligent electronic device (IED) of an electric power distribution system; and
   a key device configured to perform operations comprising:
     receiving a request from the IED for communication with an additional component of the electrical power distribution system;
     establishing a Media Access Control security key agreement (MKA) connectivity association with the IED in response to receipt of the request;
     generating a security association key (SAK) in response to receipt of the request; and
     distributing the SAK to the IED via the MKA connectivity association to enable the IED to use the SAK to communicate via a Media Access Control security (MACsec) communication link that is isolated from the key device;
   wherein:
     the IED is configured to transmit an updated request to the key device at a particular frequency; and,
     the key device is configured to generate an updated SAK and distribute the updated SAK to the IED each time the key device receives the updated request from the IED to enable the IED to use the updated SAK to communicate via an updated MACsec communication link.

2. The system of claim 1, wherein the IED is configured to use the SAK to encrypt data, to decrypt data, or both.

3. The system of claim 1, wherein the SAK is a first copy of the SAK, and the key device is configured to perform operations comprising:
   generating a second copy of the SAK in response to receipt of the request; and
   distributing the second copy of the SAK to the additional component to enable the IED and the additional component to use the first copy of the SAK and the second copy of the SAK, respectively, to communicate with one another via the MACsec communication link.

4. The system of claim 3, wherein the key device is configured to identify the additional component based on the request.

5. The system of claim 3, wherein the additional component comprises an additional IED, a gateway, a computing device, or any combination thereof, of the electric power distribution system.

6. The system of claim 1, wherein the key device is configured to establish the MKA connectivity association with the IED by:
   identifying a first connectivity association key (CAK) possessed by the IED;
   establishing an adoption link with the IED;
   generating a second CAK;
   providing the second CAK to the IED via the adoption link; and
   establishing the MKA connectivity association with the IED based on a verification that the IED possesses the second CAK.

7. The system of claim 6, wherein the key device is configured to perform operations comprising:
- periodically generating an updated CAK after establishing the adoption link with the IED;
- providing the updated CAK to the IED via the adoption link after generating the updated CAK; and
- establishing an updated MKA connectivity association with the IED each time the updated CAK is provided to the IED based on a verification that the IED possesses the updated CAK.

8. A controller of a key device for an electric power distribution system, the controller comprising a tangible, non-transitory computer readable medium comprising instructions that, when executed by processing circuitry, are configured to cause the processing circuitry to perform operations comprising:
- receiving a request from a first intelligent electronic device (IED) for communication with an additional component of the electric power distribution system;
- establishing a Media Access Control security key agreement (MKA) connectivity association with the IED in response to receipt of the request;
- generating a security association key (SAK) in response to receipt of the request;
- distributing the SAK to the first IED via the MKA connectivity association to enable the first IED to use the SAK to communicate via a Media Access Control security (MACsec) communication link that is isolated from the key device; and
- generating an updated SAK each time an updated request is received from the first IED, the first IED configured to transmit the updated request at a particular frequency; and,
- distributing, each time the updated request transmitted at the particular frequency is received from the first IED, the updated SAK to the first IED to enable the first IED to communicate via an updated MACsec communication link.

9. The controller of claim 8, wherein the additional component comprises a second IED and the instructions further cause the processing circuitry to distribute a copy of the SAK to the second IED.

10. The controller of claim 9, wherein the instructions, when executed by the processing circuitry, are configured to cause the processing circuitry to perform operations comprising establishing a second MKA connectivity association with the second IED in response to receipt of the updated request and distributing a copy of the updated SAK to the second IED.

11. The controller of claim 8, wherein the instructions, when executed by the processing circuitry, are configured to cause the processing circuitry to generate the updated SAKs at the particular frequency for distribution to the first IED, the additional component, or both.

12. The controller of claim 8, wherein the particular frequency comprises a threshold block of time that has elapsed, a threshold amount of data transmitted through use of one of the updated SAKs, or both.

13. A method, comprising:
- a key device receiving a request from an intelligent electronic device (IED) of an electric power delivery system IED to establish a secure communication link with an additional component of the electric power delivery system;
- establishing a Media Access Control security key agreement (MKA) connectivity association with the IED in response to receipt of the request;
- generating a security association key (SAK) in response to receipt of the request;
- distributing the SAK to the IED via the MKA connectivity association to enable the IED to use the SAK to communicate via a Media Access Control security (MACsec) communication link that is isolated from the key device;
- the IED configured to transmit an updated request to the key device at a particular frequency; and
- the key device generating an updated SAK and distributing the updated SAK to the IED each time the key device receives the updated request from the IED to enable the IED to use the updated SAK to communicate via an updated MACsec communication link.

14. The method of claim 13, wherein the first IED uses the SAK to encrypt and decrypt data transmitted between the IED and the additional component.

15. The method of claim 13, further comprising:
- establishing a second MKA connectivity association with another IED in response to receipt of the request;
- generating a copy of the SAK in response to receipt of the request; and
- distributing the copy of the SAK to the another IED via the second MKA connectivity association to enable the IED and the another IED to
- communicate with one another via the SAK and, the copy of the SAK.

16. The method of claim 13, further comprising:
- receiving an additional request from the IED to establish a secure communication link with another IED;
- establishing a second MKA connectivity association with the another IED in response to receipt of the additional request;
- generating an additional SAK and a copy of the additional SAK in response to receipt of the additional request;
- distributing the additional SAK to the IED via the first MKA connectivity association; and
- distributing the copy of the additional SAK to the another IED via the second MKA connectivity association.

17. The method of claim 13, further comprising:
- establishing a first MKA connectivity association with the IED based on the IED possessing a first connectivity association key (CAK); and establishing a second MKA connectivity association with the additional component based on the additional component possessing a second CAK.

* * * * *